(12) United States Patent
Jiang (10) Patent No.: US 8,520,521 B2
(45) Date of Patent: Aug. 27, 2013

(54) METHOD AND APPARATUS FOR INITIATING A STORAGE WINDOW IN A WIRELESS COMMUNICATIONS SYSTEM

(75) Inventor: Sam Shiaw-Shiang Jiang, Taipei (TW)

(73) Assignee: Innovative Sonic Limited, Port Louis (MU)

(*) Notice: Subject to any disclaimer, the term of this patent is extended or adjusted under 35 U.S.C. 154(b) by 1233 days.

(21) Appl. No.: 11/528,453

(22) Filed: Sep. 28, 2006

(65) Prior Publication Data
US 2007/0071008 A1 Mar. 29, 2007

Related U.S. Application Data

(60) Provisional application No. 60/596,507, filed on Sep. 29, 2005.

(51) Int. Cl.
*G06F 11/00* (2006.01)

(52) U.S. Cl.
USPC ........... 370/235; 370/349; 370/394; 370/474; 714/18; 714/708; 714/748; 455/422.1; 709/236; 709/246

(58) Field of Classification Search
USPC ............. 370/235, 320, 335, 342, 349, 394; 370/441, 474, 476; 714/18, 708, 748–750; 455/422.1; 709/236, 246
See application file for complete search history.

(56) References Cited

U.S. PATENT DOCUMENTS

| 6,798,842 | B2 | 9/2004 | Jiang | |
|---|---|---|---|---|
| 2003/0072292 | A1 | 4/2003 | Yoon | |
| 2003/0123403 | A1* | 7/2003 | Jiang | 370/328 |
| 2003/0128705 | A1* | 7/2003 | Yi et al. | 370/394 |
| 2003/0202475 | A1* | 10/2003 | Chen et al. | 370/235 |
| 2004/0013213 | A1 | 1/2004 | Bi | |
| 2005/0204251 | A1 | 9/2005 | Moon | |

FOREIGN PATENT DOCUMENTS

| CN | 1368817 A | 9/2002 |
|---|---|---|
| JP | 7038612 | 2/1995 |
| JP | 2002-271442 | 9/2002 |
| JP | 2007-533280 | 11/2007 |
| KR | 20020041569 | 6/2002 |
| KR | 20020071750 | 9/2002 |
| KR | 20030012152 | 2/2003 |
| KR | 10-20050088602 | 9/2005 |

(Continued)

OTHER PUBLICATIONS

LG Electronics Inc., Correction to Operation of Timer_OSD—3GPP TSG-RAN WG RAN2#47 (R2-051420), May 9-13, 2005, 3GPP.*

(Continued)

*Primary Examiner* — Hoon J Chung
(74) *Attorney, Agent, or Firm* — Blue Capital Law Firm, P.C.

(57) ABSTRACT

A method for initiating a storage window of a receiving end in a wireless communications system, which periodically retransmits previously transmitted data packets in an unacknowledged mode, includes receiving a first PDU after a receiving entity of the receiving end is established, re-established, or after a timer expires, and initiating a state variable, which is defined to be a sequence number of the highest numbered packet that has been received, according to a sequence number of the first received packet. An example of the wireless communications system is the Universal Mobile Telecommunications System (UMTS) with a multimedia broadcast/multicast service (MBMS) application.

14 Claims, 5 Drawing Sheets

(56) References Cited

FOREIGN PATENT DOCUMENTS

| TW | 535448 | 6/2003 |
|---|---|---|
| TW | I223532 | 11/2004 |
| TW | I238629 | 8/2005 |
| WO | 2005/117317 A1 | 12/2005 |

OTHER PUBLICATIONS

"3rd Generation Partnership Project; Technical Specification Group Radio Access Network; Radio Link Control (RLC) protocol specification (Release 6)", 3GPP TS 25.322 V6.4.0 (Jun. 2005), pp. 1-84. 3GPP, France.

3GPP TS 25.322 V6.4.0 (Jun. 2005), "Radio Link Control (RLC) Protocol Specification (Release 6)".

R2-052262, "Clarification on reception of UMD PDU when OSD function is configured", Huawei and ASUSTeK, 3GPP TSG-RAN2 Meeting #48, London, U.K. Aug. 29-Sep. 2, 2005.

QUALCOMM: "Out-of-sequence reception for RLC-UM", 3GPP TSG-RAN WG2 meeting #47, R2-051451, May 9-13, 2005, XP050128647, Athens, Greece, total 15 pages (including QUALCOMM Europe: "Support for out-of-sequence PDUs in RLC-UM", Change Request, 25.322 CR CRNum rev—current version: 6.3.0, 3GPP TSG-RAN WG2 Meeting #47, May 8-14, 2005, XP050128647, Athens, Greece & QUALCOMM Europe: "Support for out-of-sequence PDUs in RLC-UM", Change Request, 25.331 CR CRNum rev—current version: 6.5.0, 3GPP TSG-RAN-WG2 Meeting #47, May 8-14, 2005, XP050128647, Athens, Greece).

Siemens AG: "Out-of-sequence reception in UM-RLC", 3GPP TSG-RAN WG2 Meeting #20, R2-010903, Apr. 9-13, 2001, XP050117693, Hayama, Japan.

Huawei Technologies et al: "Out of Sequence Operations for MCCH", 3GPP TSG RAN WG2 #45, R2-042336, Nov. 15-19, 2004, XP050126922, Shin-Yokohama, Japan.

* cited by examiner

METHOD AND APPARATUS FOR INITIATING A STORAGE WINDOW IN A WIRELESS COMMUNICATIONS SYSTEM

CROSS REFERENCE TO RELATED APPLICATIONS

This application claims the benefit of U.S. Provisional Application No. 60/596,507, filed on Sep. 29, 2005 and entitled "METHOD AN APPARATUS FOR INITIATING STORAGE WINDOW FOR OUT OF SEQUENCE DELIVERY IN MBMS APPLICATION," the contents of which are incorporated herein by reference.

BACKGROUND OF THE INVENTION

1. Field of the Invention

The present invention relates to methods of initializing storage windows in wireless communications systems, and in particular, the present invention discloses a method and apparatus for initializing a storage window in a wireless communications system that operates in Unacknowledged Mode (UM) and periodically retransmits previously transmitted packets to avoid unnecessary packet deletion so as to increase data receiving efficiency.

2. Description of the Prior Art

With advances in mobile communications device technologies in recent years, entertainment and information services applications have become increasingly widespread. In a $2^{nd}$ generation (2G) mobile communications system, multimedia services are mostly limited to Short Messaging Services (SMS), with each text message containing no more than 160 characters. Only simple ring tones, ranging from about 3 to 20 Kbytes, and other small data files, can be downloaded. However, with development of 2.5G and 3G mobile networking technology, along with an increase in processor core performance, multimedia services in mobile communications have reached higher data transmission capacities, and many new types of multimedia services have been developed.

Taking Multimedia Broadcast/Multicast Service (MBMS) as an example, MBMS is established upon a foundation of a Universal Mobile Telecommunications System (UMTS), which is based on a Wideband Code Division Multiple Access (WCDMA) technology. The MBMS uses digital data packets to transmit service content from servers to multiple user devices. The MBMS also uses information broadcasting/multicasting technologies to provide data streaming and downloading services.

For the MBMS of the UMTS, the 3G Partnership Project (3GPP) defines a Radio Link Control (RLC) communications protocol, 3GPP TS 25.322 V6.4.0, which provides an "out of sequence Service Data Unit (SDU) delivery" function, so that a receiver operating in an Unacknowledged Mode (UM) can more efficiently process Protocol Data Units (PDUs) that are periodically retransmitted by a transmitter. Operating in the Unacknowledged Mode means that, although transmitted packets (PDUs) comprise sequence numbers (SNs), the receiver does not report a receiving status back to the transmitter when it receives or misses a packet. Therefore, in UM, the transmitter cannot ensure whether packets it has transmitted are successfully received.

To increase a probability that the receiver successfully receives packets, the transmitter can periodically retransmit packets that it has already transmitted, and the MBMS in UM uses this kind of periodic retransmission mechanism. When the RLC entity of the receiver in UM initiates the out of sequence SDU delivery function, the RLC entity recombines and delivers the SDUs to an upper protocol layer as fast as it can. In other words, even if a PDU with an earlier (lower) SN has not yet been successfully received, as long as a PDU comprising a complete SDU has been successfully received, the RLC entity delivers the complete SDU to the upper layer. In addition, when the out of sequence SDU delivery function is initiated, in order to allow the retransmitted SDUs to be reconstructed effectively by the receiver, a buffer of the receiver stores a PDU until all SDUs of the stored PDU have been reconstructed, after which the PDU is deleted from the buffer. Other than that, to maintain good receiving efficiency, the prior art deletes PDUs from the buffer in accordance with a storage window and a timer.

For the out of sequence SDU delivery function, the specification mentioned above also defines the following variables and parameters:

1. VR(UOH): A variable representing a highest of all SNs of all PDUs that have been received;
2. OSD_Window_Size: A parameter representing a size of a storage window; and
3. Timer_OSD: A timer representing a time spent waiting to receive a next PDU that is outside the storage window. When a PDU outside the storage window is received, the timer is started if it is not active or restarted if it is active. If the timer expires, the receiver deletes all PDUs in the storage window.

According to the specification described above, after establishing or re-establishing the receiving entity of the receiver, and when the receiver receives a first PDU, based on a SN of the first PDU, the variable VR(UOH) is initialized and set to SN-1. If the SN of the PDU received by the receiver is outside of the storage window, meaning the SN of the PDU is not in a set of {x|VR(UOH)>=>VR(UOH)-OSD_Window_Size }, the variable VR(UOH) is set to be the SN of the PDU, i.e. VR(UOH)=SN. Additionally, if the timer Timer_OSD expires, the PDUs in the storage window are deleted.

Using the out of sequence SDU delivery function, the RLC entity reassembles SDUs and delivers them to the upper layer as soon as possible. However, in some cases, the prior art cannot efficiently reassembles SDUs. Please refer to the following explanation for further details. After the variable VR(UOH) of a receiver has been initialized, if the receiver temporarily moves out of service coverage of a transmitter, and the timer Timer_OSD expires before moving back into service coverage of the transmitter, the receiver deletes all PDUs in the storage window since the timer Timer_OSD has expired in order to avoid mistakenly combining PDUs received before moving out of service coverage with PDUs received after moving back into service coverage. However, this mechanism may actually prevent the receiver from correctly combining PDUs after moving back into service coverage of a base station (i.e. the transmitter).

Figure 1:
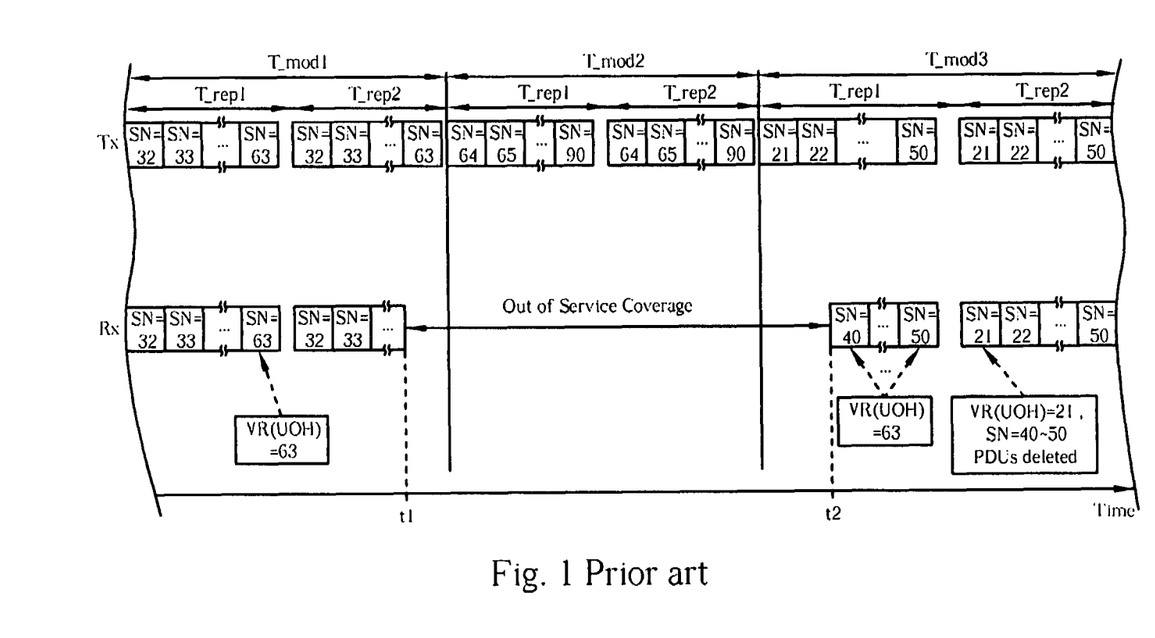
FIG. 1 is a diagram of a UMTS providing an MBMS in the prior art.

For example, please refer to FIG. 1. FIG. 1 is a diagram of a UMTS providing a MBMS service in the prior art. In the example, the MBMS is operating in UM. For simplicity, FIG. 1 only shows the transmitting status at the transmitter and the receiving status at the receiver of PDUs that the transmitter sends to the receiver within a short timeframe. Assuming that the size of the storage window is 32, i.e. OSD_Window_Size=32, a transmitter periodically transmits PDUs with SN=32 to 63, SN=64 to 90, and SN=21 to 50 during modification periods T_mod1, T_mod2, and T_mod3, respectively. The three modification periods T_mod1, T_mod2, and T_mod3 are equal in length, and each comprises two repetition periods T_rep1 and T_rep2. Packets transmitted during the repetition period T_rep1 are retransmitted during the repetition period T_rep2, so that a probability of successful reception of all packets is increased. The modification period T_mod3 needs not follow right after the modification period T_mod2. After the receiver receives PDUs with SN=32 to 63 during modification period T_mod1, the receiver reassembles SDUs by combining the PDUs, delivers the reassembled SDUs to the upper layer, sets VR(UOH)=63, and sets a range of the storage window to be a set of {x|32<=x<=63}.

At time point t1, the receiver moves out of service coverage of the transmitter. After the timer Timer_OSD expires (not shown in FIG. 1), the receiver moves back into service coverage of the transmitter at time point t2. When the timer Timer_OSD expires, the receiver deletes all PDUs in storage window with the range of the storage window remaining at the set of {x|32<=x<=63}. In other words, the receiver moves out of service coverage of the transmitter at time point t1 and moves back into service coverage again at time point t2, and a deletion of PDUs in the storage window is initiated as the timer Timer_OSD expires while keeping the range of the storage window unchanged. After the receiver moves back into service coverage of the transmitter, during the repetition period T_rep1 of the modification period T_mod3, the receiver receives PDUs with SN=40 to 50. Since SN=40 to SN=50 falls within the range of the storage window, the PDUs with SN=40 to 50 are stored in the buffer. Thereafter, the receiver receives a PDU with SN=21 during the repetition time T_rep2 of the modification time T_mod3. Now, since the SN=21 is outside of the range of the storage window, the variable VR(UOH) is updated to be 21, such that the PDUs with SNs=40 to 50 fall outside of the storage window, causing the PDUs with SN=40 to 50 to be deleted. In other words, after the timer Timer_OSD expires, the receiver will not initialize the storage window, such that after the PDUs with SN=40 to 50 are received by the receiver, they are subsequently deleted from the buffer. This wastes system resources. If the receiver does not completely receive the PDUs with SN=40 to 50 during the repetition time T_rep2 of the modification time T_mod3, the receiver cannot reassemble the corresponding SDUs successfully.

SUMMARY OF THE INVENTION

According to the present invention, a method of initializing a storage window of a receiver in a wireless communications system operating in Unacknowledged Mode and periodically retransmitting previously transmitted packets comprises after a receiving entity of the receiver has been established, re-established, or a timer of the receiver has expired, and when the receiver receives a packet, initializing a variable of a sequence number of a highest numbered packet that has been received in the receiver according to a sequence number of the received packet.

According to the present invention, a wireless communications device for initializing a storage window, the wireless communications device used in a wireless communications system that operates in Unacknowledged Mode and periodically retransmits previously transmitted packets, the wireless communications device comprises a control circuit for realizing functions of the wireless communications device, a processor for executing program code to control the control circuit, and a memory for storing the program code. The program code comprises after a receiving entity of the wireless communications device has been established, re-established, or a timer of the wireless communications device has expired, and when the wireless communications device receives a packet, initializing a variable of a sequence number of a highest numbered packet that has been received in the wireless communications device according to a sequence number of the received packet.

These and other objectives of the present invention will no doubt become obvious to those of ordinary skill in the art after reading the following detailed description of the preferred embodiment that is illustrated in the various figures and drawings.

DETAILED DESCRIPTION

The present invention is used to avoid unnecessary deletion of PDUs in a communications system operating in UM that periodically retransmits previously transmitted packets. The communications system can be a UMTS that provides MBMS.

Figure 2:
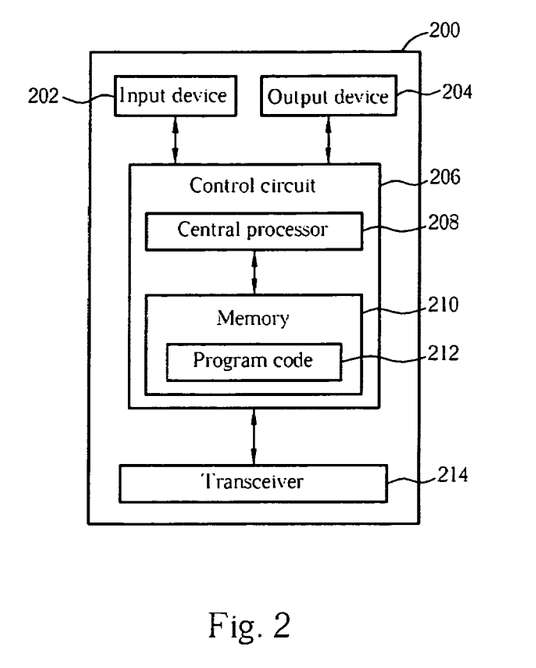
FIG. 2 is a block diagram of a mobile communications device according to the present invention.

First of all, please refer to FIG. 2. FIG. 2 is a block diagram of a mobile communications device 200. For clarity, FIG. 2 only shows an input device 202, an output device 204, a control circuit 206, a central processor 208, a memory 210, a program code 212, and a transceiver 214 of the mobile communications device 200. In the mobile communications device 200, the control circuit 206 executes the program code 212 stored in the memory 210 with the central processor 208, thereby controlling operations of the mobile communications device 200. The mobile communications device 200 can receive signals input by users through the input device 202 (such as a keyboard), or output signals like images, sounds, etc. through the output device 204 (such as a monitor, speakers, etc.). The transceiver 214 is used for receiving and transmitting wireless signals by delivering received wireless signals to the control circuit 206 and outputting signals generated by the control circuit 206 wirelessly. In a communications protocol framework, the transceiver 214 is known as a part of Layer one, whereas the control circuit 206 is used to realize functions of Layer two and Layer three.

Figure 3:
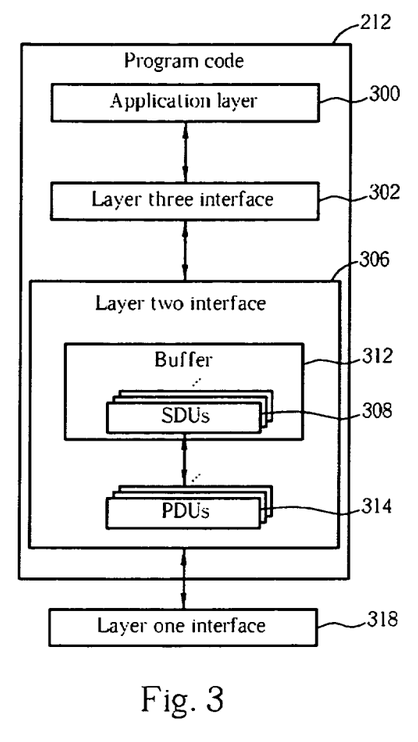
FIG. 3 is a schematic diagram of program code in FIG. 2.

Please refer to FIG. 3. FIG. 3 is a schematic diagram of the program code 212 in FIG. 2. The program code 212 comprises an application layer 300, a Layer three interface 302, a Layer two interface 306, and a Layer one interface 318. When transmitting signals, the Layer two interface 306 forms a plurality of SDUs 308 according to the data outputted by the Layer three interface 302, and stores the plurality of SDUs 308 in a buffer 312. Then, the Layer two interface 306 generates a plurality of PDUs 314 according to the SDUs 308 stored in the buffer 312, and outputs the PDUs 314 generated to a destination through the Layer one interface 318. In contrast, when receiving a wireless signal, the wireless signal is received through the Layer one interface 318, and the Layer one interface 318 outputs the wireless signal as PDUs 314 to the Layer two interface 306. The Layer two interface 306 restores the PDUs 314 to SDUs 308 and stores the SDUs 308 in the buffer 312. Finally, the Layer two interface 306 transmits the SDUs 308 stored in the buffer 312 to the Layer three interface 302. When the wireless signals are received, whether the program code 212 stores the SDUs 308 in the buffer 312 depends on the range of the storage window. If an SN of a PDU received falls within the range of the storage window, then procedures such as sorting, deleting duplicates, etc. are executed. On the other hand, if the SN of the PDU falls outside of the range of the storage window, then procedures like advancing the storage window location, etc. are executed.

When the wireless communication device 200 operates in MBMS or in any UM communications system that periodically retransmits packets that have been transmitted, the program code 212 initiates an out of sequence SDU delivery function to reassemble SDUs and deliver them to the upper layer as soon as possible, meaning that even if there exists an SDU carried by a PDU with an earlier (lower) SN that has not been successfully received, when PDUs of later (higher) SNs comprising complete SDUs are received, the Layer two interface 306 of the program code 212 will reassemble the complete SDUs and deliver them to the upper layer. To avoid PDUs in the storage window being deleted unnecessarily after the out of sequence SDU delivery function has been initiated as occurs in the prior art, the present invention provides a method for initializing the storage window.

Figure 4:
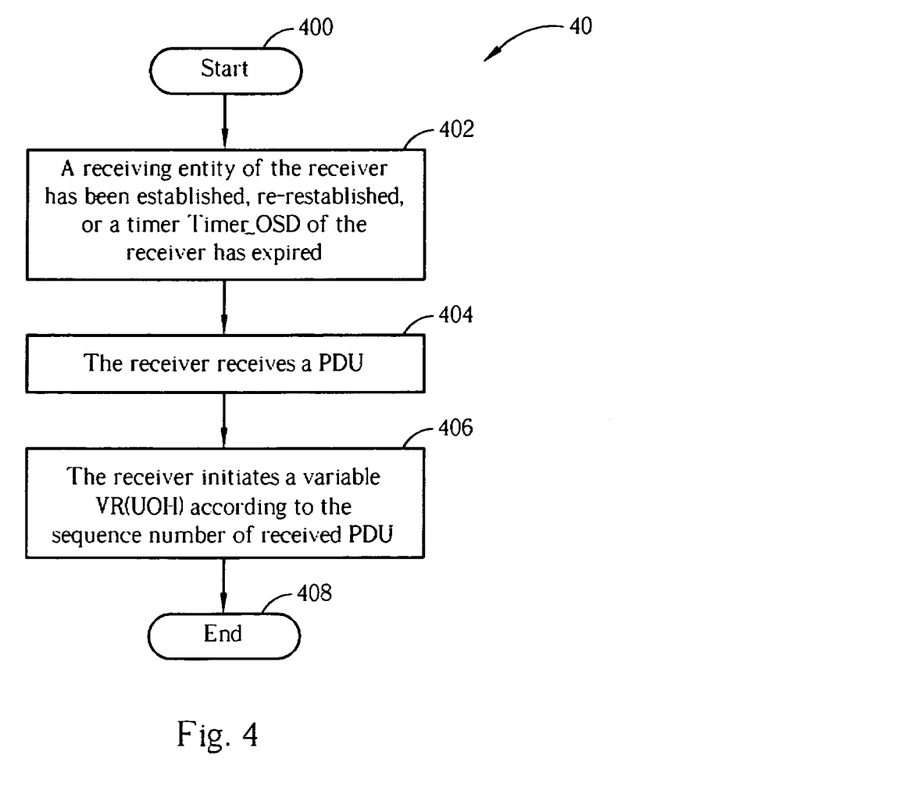
FIG. 4 is a flow chart of procedures for initializing a storage window of a receiver in a wireless communications system that is operating in UM and periodically retransmits previously transmitted packets.

Please refer to FIG. 4. FIG. 4 is a procedure 40 of the present invention. The procedure 40 is used to initialize a storage window of a receiver in a wireless communications system that is operating in UM and periodically retransmits previously transmitted packets. The procedure 40 comprises following steps:

Step 400: Start.
Step 402: A receiving entity of the receiver has been established, re-established, or a timer Timer_OSD of the receiver has expired;
Step 404: The receiver receives a PDU;
Step 406: The receiver initializes a variable VR(UOH) according to the sequence number of the received PDU.
Step 408: End.

Therefore, in accordance with the procedure 40, after a receiving entity of the receiver has been established, re-established, or a timer Timer_OSD of the receiver has expired (402), and the receiver receives a packet (404), a variable VR(UOH) is initialized according to the sequence number of the received packet (406). Moreover, if a PDU whose SN falls outside of the storage window is received by the receiver, meaning the SN of the PDU is not in the set of $\{x|VR(UOH)\text{-}OSD\_Window\_Size+1<=x<=VR(UOH)\}$, then the variable VR(UOH) is set to be the SN of the PDU, i.e. VR(UOH)=SN. In addition, if the timer Timer_OSD has expired, then PDUs in the storage window are deleted.

Thus, the program code 212 having initiated the out of sequence SDU delivery function, if the receiving entity of the wireless communication device 200 has been established, re-established, or the timer Timer_OSD has expired, and the wireless communication device 200 receives a first PDU, then the variable VR(UOH) is initialized based on the SN of the PDU, preferably as VR(UOH)=SN-1. In other words, in addition to handling cases of the receiving entity being established or re-established, the present invention also initializes the variable VR(UOH) after the timer Timer_OSD has expired, thereby changing the location of the storage window. Therefore, if the wireless communication device 200 temporarily moves out of service coverage of a transmitter, and the timer Timer_OSD has expired by the time the wireless communication device 200 moves back into service coverage of the transmitter, the wireless communication device 200 deletes all PDUs stored in the buffer 314 and the variable VR(UOH) is initialized. In this manner, the location of the storage window is changed in accordance with the initialized variable VR(UOH) and the PDUs received later will not be unnecessarily deleted.

Figure 5:
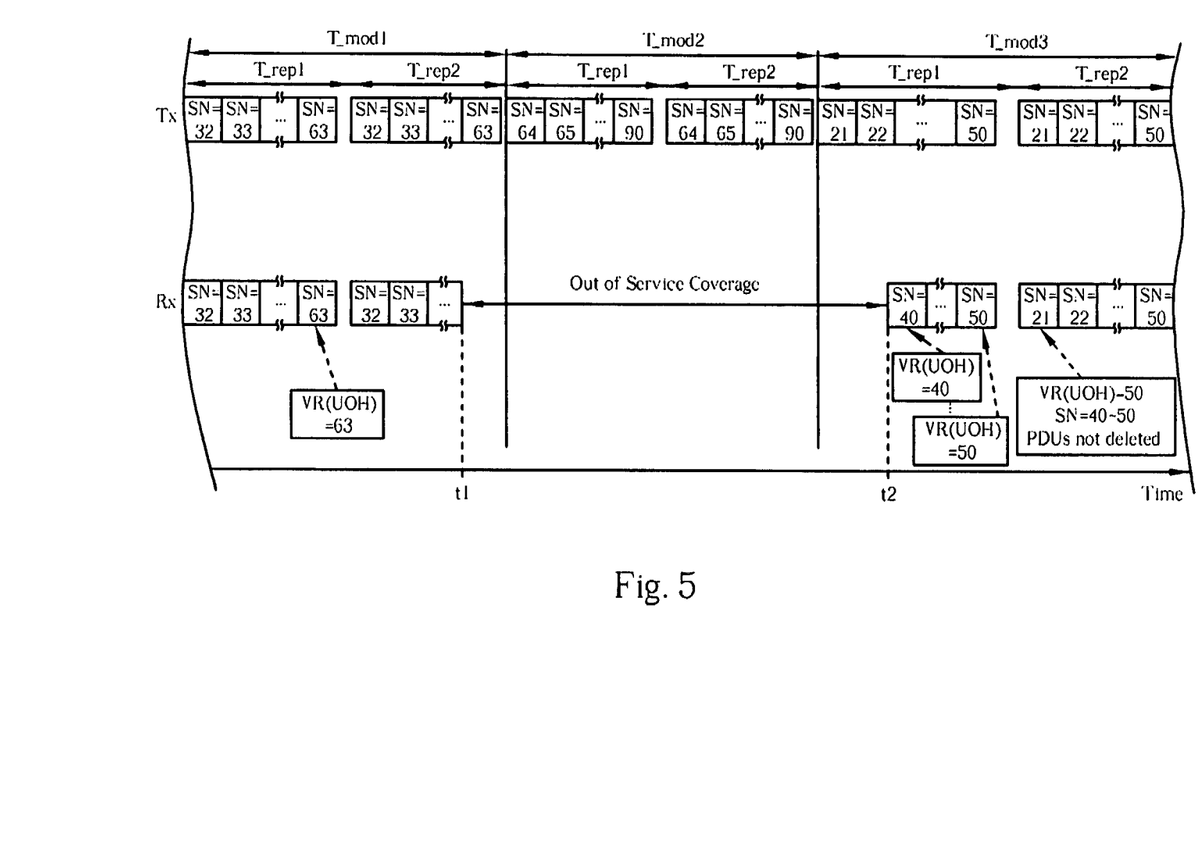
FIG. 5 is a diagram of a UMTS providing MBMS in the present invention.

For example, please refer to FIG. 5. FIG. 5 is a diagram of a UMTS providing MBMS in accordance to the procedure 40 in the present invention. The MBMS is operating in UM. For simplification, FIG. 5 only shows transmitting and receiving statuses of corresponding PDUs between the transmitter and the receiver within a certain period of time. Suppose that the size of the storage window is 32, i.e. OSD_Window_Size =32. A transmitter periodically transmits PDUs with SN=32 to 63, SN=64 to 90, and SN=21 to 50 during modification periods T_mod1, T_mod2, and T_mod3, respectively. The three modification periods T_mod1, T_mod2, and T_mod3 are equal in length, and each comprises two repetition periods T_rep1 and T_rep2. Packets transmitted during the repetition period T_rep1 will be retransmitted again during the repetition period T_rep2, so that a probability of successfully receiving all packets is increased. The modification period T_mod3 needs not immediately follow the modification period T_mod2.

After the receiver receives PDUs with SN=32 to 63 during modification period T_mod1, the receiver combines the received PDUs into corresponding SDUs and delivers them to the upper layer. The receiver also sets VR(UOH)=63 so that the location of the storage window is the set of $\{x|32<=x<=63\}$. At time point t1, the receiver moves out of service coverage of the transmitter. After the timer Timer_OSD expires (not shown in FIG. 5), the receiver moves back into service coverage of the transmitter at time point t2. When the timer Timer_OSD has expired, the receiver deletes all PDUs in the storage window, and the variable VR(UOH) is initialized in accordance with an SN of a first PDU received by the receiver, i.e. VR(UOH)=SN-1 according to the procedure 40 of the present invention. Thus, as the receiver receives a PDU with SN=40 during the repetition time T_rep 1 of the modification time T_mod 3, the present invention sets VR(UOH)=40. (The variable VR(UOH) is initialized to 39 at first. Then, since SN=40 falls outside of the storage window, VR(UOH) is set to 40 eventually.) When a PDU with SN=50 is received, VR(UOH)=50, and the location of the storage window is the set of $\{x|50\text{-}32+1<=x<=50\}=\{x|19<=x<=50\}$. Thereafter, the receiver receives PDUs with SN=21 during the repetition time T_rep2 of the modification time T_mod3. Now, since the SN=21 is within the set $\{x|19<=x<=50\}$, the SN=21 is within the range of the storage window. Therefore, the location of the storage window is not changed, and PDUs with SN=40 to 50 are not deleted. In other words, in the present invention, after the timer Timer_OSD has expired, the storage window is initialized to avoid unnecessary deletion of PDUS.

When realizing the present invention procedure 40, as known by people who are familiar with the art, designers can write (burn-in) the procedures 40 into a memory (firmware) 210 of a communication device 200 as a program code 212.

In summary, in the present invention method, after a receiving entity of a receiver has been established, re-established, or a timer of the receiver has expired, and the receiver receives a first PDU, the receiver initializes the variable VR(UOH) according to the SN of the first PDU. Thus, a storage window is initialized and a location of the storage window is advanced. It avoids unnecessary deletion of PDUs and hence increases efficiency when reassembling SDUs.

Those skilled in the art will readily observe that numerous modifications and alterations of the device and method may be made while retaining the teachings of the invention.

Accordingly, the above disclosure should be construed as limited only by the metes and bounds of the appended

What is claimed is:

1. A method of initializing a storage window of a receiver in a wireless communications system operating in Unacknowledged Mode and periodically retransmitting previously transmitted packets, the method comprising:
   a timer, called Timer_OSD, of the receiver having expired; deleting all packets in the storage window;
   the receiver receiving a first packet after Timer_OSD expired, wherein a sequence number of the received first packet is less than or equal to a variable of a sequence number of a highest numbered packet that has been received by the receiver and is greater than the difference between the variable and a size of the storage window; and
   initializing the variable according to the sequence number of the received first packet to change a location of the storage window.

2. A wireless communications device for initializing a storage window, the wireless communications device used in a wireless communications system that operates in Unacknowledged Mode and periodically retransmits previously transmitted packets, the wireless communications device comprising:
   a control circuit for realizing functions of the wireless communications device;
   a processor for executing program code to control the control circuit; and
   a memory for storing the program code; wherein the program code comprises the method of claim 1.

3. The wireless communications device of claim 2, wherein a location of the storage window is defined according to the variable of the sequence number of the highest numbered packet that has been received in the receiver and a size of the storage window.

4. The wireless communications device of claim 2, wherein the timer is used to count how much time passes before receiving a next packet that is outside the storage window, and when a PDU outside the storage window is received, the timer is started if it is not active or restarted if it is active, and if the tinier expires, the receiver deletes all PDUs in the storage window.

5. The wireless communications device of claim 2, wherein initializing the variable of the sequence number of the highest numbered packet that has been received in the receiver is setting the variable to be equal to the sequence number of the received first packet less a predefined value.

6. The wireless communications device of claim 2, wherein the wireless communications system provides a Multimedia Broadcast/Multicast Service.

7. The wireless communications device of claim 2, wherein an out of sequence Service Data Unit delivery function of the receiver is initiated.

8. The method of claim 1, wherein a location of the storage window is defined according to the variable of the sequence number of the highest numbered packet that has been received in the receiver and a size of the storage window.

9. The method of claim 1, wherein the timer is used to count how much time passes before receiving a next packet that is outside the storage window, and when a PDU outside the storage window is received, the timer is started if it is not active or restarted if it is active, and if the timer expires, the receiver deletes all PDUs in the storage window.

10. The method of claim 1, wherein initializing the variable of the sequence number of the highest numbered packet that has been received in the receiver is setting, the variable to be equal to the sequence number of the received first packet less a predefined value.

11. The method of claim 10 wherein the predefined value is 1.

12. The method of claim 1, wherein the wireless communications system provides a Multimedia Broadcast/Multicast Service.

13. The method of claim 1, wherein an out of sequence Service Data Unit delivery function of the receiver is initiated.

14. A method of initializing a storage window of a receiver in a wireless communications system operating in Unacknowledged Mode and periodically retransmitting previously transmitted packets, the method comprising:
   the receiver having an established window; and a timer, called Timer_OSD, of the receiver having expired;
   deleting all packets in the storage window;
   the receiver receiving a first packet after Timer_OSD expired, the first packet having a sequence number falling within the established storage window of the receiver, wherein the sequence number of the received first packet is less than or equal to a variable of a sequence number of a highest numbered packet that has been received in the receiver and is greater than the difference between the variable and a size of the storage window; and
   initializing the variable according to the sequence number of the received first packet to change a location of the storage window.

* * * * *